(12) United States Patent
Crutchfield

(10) Patent No.: US 8,380,329 B2
(45) Date of Patent: Feb. 19, 2013

(54) CONTROLLING A DIGITAL AUDIO PLAYER FROM A CASSETTE TAPE PLAYER ADAPTER

(75) Inventor: Randolph E. Crutchfield, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 2949 days.

(21) Appl. No.: 10/045,524

(22) Filed: Nov. 7, 2001

(65) Prior Publication Data

US 2003/0088325 A1 May 8, 2003

(51) Int. Cl.
*G06F 17/00* (2006.01)
*H04R 29/00* (2006.01)

(52) U.S. Cl. .............................. 700/94; 381/58; 381/124

(58) Field of Classification Search .................. 455/575, 455/575.2; 700/94; 381/58, 59, 86, 124; 235/493; 360/32, 55; 369/1–2, 11, 30.01, 369/63; 704/270, 272; 333/124, 17.3, 32
See application file for complete search history.

(56) References Cited

U.S. PATENT DOCUMENTS

| | | | |
|---|---|---|---|
| 5,097,378 A * | 3/1992 | Nakabayashi | 360/137 |
| 5,161,131 A | 11/1992 | Borchardt et al. | |
| 5,307,326 A | 4/1994 | Osawa | |
| 5,654,942 A | 8/1997 | Akahane | |
| 6,301,513 B1 * | 10/2001 | Divon et al. | 700/94 |
| 6,560,341 B1 * | 5/2003 | Coyle | 381/63 |
| 6,594,366 B1 * | 7/2003 | Adams | 381/74 |
| 2002/0084334 A1 * | 7/2002 | Zhang | 235/493 |

FOREIGN PATENT DOCUMENTS

| | | |
|---|---|---|
| DE | 41 35 220 | 4/1993 |
| DE | 299 23 129 U1 | 4/2000 |
| DE | 199 50 091 | 4/2001 |
| DE | 199 50 091 A1 | 4/2001 |
| DE | 100 12 491 A1 | 9/2001 |
| GB | 2 280 332 A | 1/1995 |
| JP | 4-330692 | 11/1992 |
| JP | 6-187714 | 7/1994 |
| JP | 11-25582 | 1/1999 |

* cited by examiner

*Primary Examiner* — Xu Mei
(74) *Attorney, Agent, or Firm* — Trop, Pruner & Hu, P.C.

(57) ABSTRACT

An adapter for a cassette tape player couples to a digital audio player. The adapter enables controls operated on the cassette tape player to control an external digital audio player. The digital audio player may be coupled to the adapter to receive signals indicative of which controls on the cassette tape player were operated. For example, in one embodiment the adapter may determine the direction of cassette tape player rotation, the initiation of rotation and the speed of rotation to detect which controls were operated. Appropriate signals may then be provided to the digital audio player, either through a wired or wireless connection, to enable the digital audio player to respond accordingly.

1 Claim, 4 Drawing Sheets

CONTROLLING A DIGITAL AUDIO PLAYER FROM A CASSETTE TAPE PLAYER ADAPTER

BACKGROUND

This invention relates generally to audio playback equipment and particularly to devices that enable digital audio players to be played through existing cassette tape players.

Digital audio players have found widespread popularity. In part this may be due to the ability to download music and other content from the Internet to a very portable device. For whatever reason, many people now prefer digital audio players to cassette tape players, radios, and compact disc players.

Unfortunately, cassette tape players are more omnipresent than digital audio players. For example, very few vehicles have sound systems that include a digital audio player. Instead, many existing vehicular sound systems include a cassette tape player.

One solution to this problem has been to provide a cassette tape player adapter in the shape of a cassette tape that may be inserted into a cassette tape player. The cassette tape player adapter may include an interface to couple to a digital audio player. As a result, the digital audio player may be played through the cassette tape adapter and ultimately through the vehicular sound system. Such techniques provide a way to utilize the stored database of digital audio on digital audio players when the sound system is not adapted for a digital audio player.

However, these techniques also have a number of disadvantages. The user must operate both the cassette tape player and the digital audio player in order to play music stored on the digital audio player. For example, to play audio from a digital audio player in this way, controls on both the digital audio player and the cassette tape player must be operated. This tends to be awkward and confusing to users.

Thus, there is a need for better ways to enable digital audio players to be used with existing sound systems that include cassette tape players.

DETAILED DESCRIPTION

Figure 1:
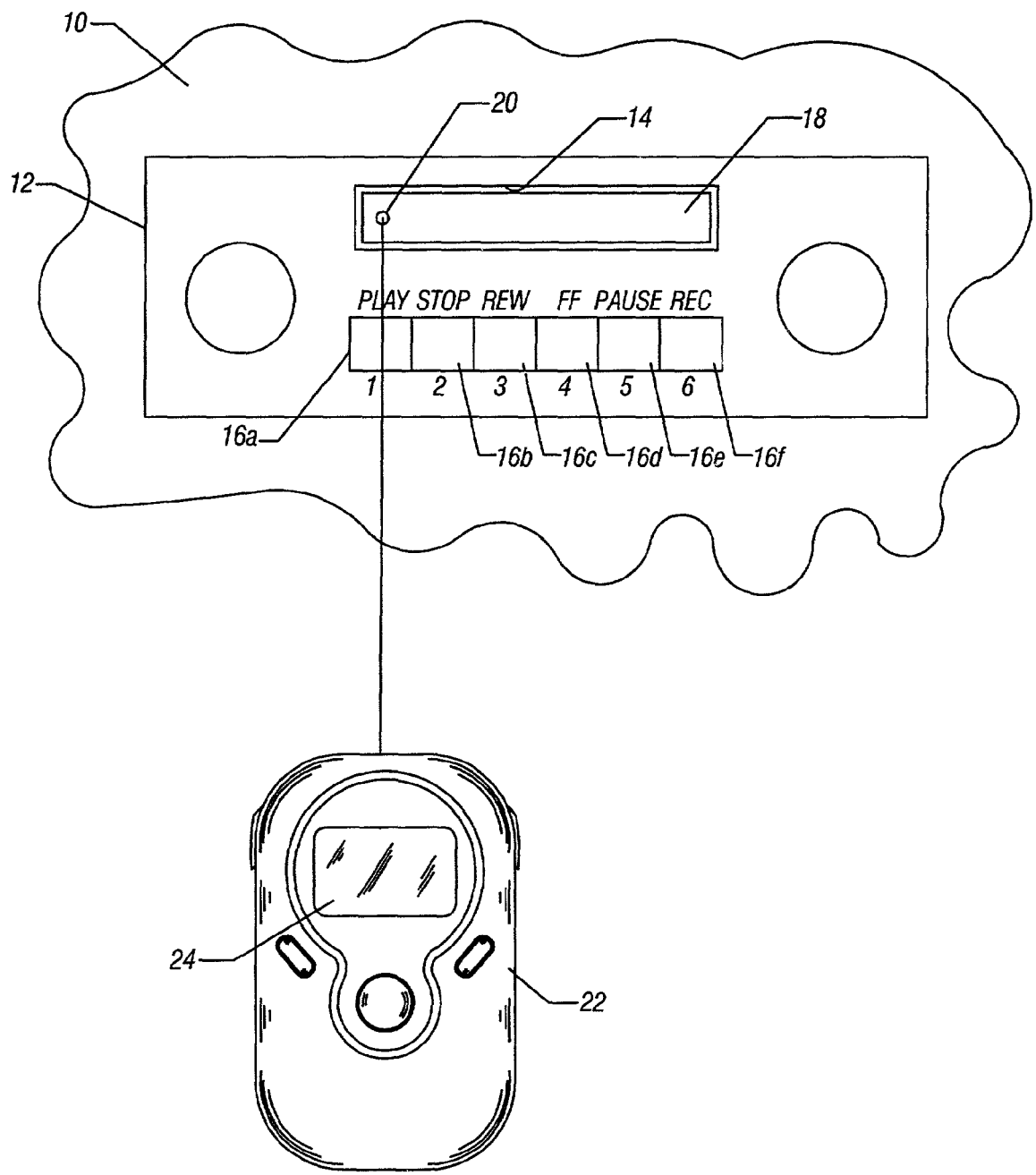
FIG. 1 is a front elevational view of one embodiment of the present invention.

Referring to FIG. 1, a vehicle dashboard 10, in accordance with one embodiment, may receive a cassette tape player 12. In some embodiments, the cassette tape player 12 may also play compact discs and receive radio signals.

The cassette tape player 12 includes an opening 14 to receive cassette tapes. In this case, a cassette tape player adapter 18 is inserted into the opening 14. The adapter 18 may have the size and shape of a cassette tape in order to be accommodated within the opening 14. In fact, the adapter 18 may not even include a tape and instead may be utilized to enable a digital audio player 22 to play files stored on the player 22 through the cassette tape player 12.

The cassette tape player 12 may include a plurality of controls 16. For example, the cassette tape player 12 may include a play button 16a, a stop button 16b, a rewind button 16c, a fast forward button 16d, a pause button 16e and a record button 16f.

Figure 2:
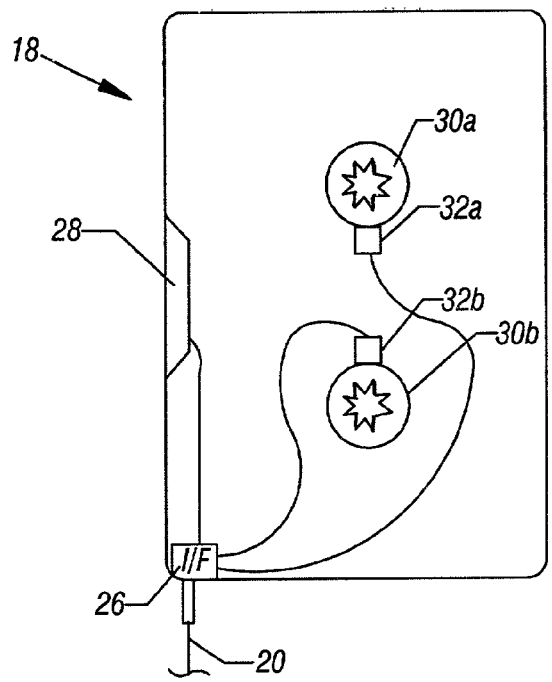
FIG. 2 is a top plan view of a cassette tape adapter shown in FIG. 1 in accordance with one embodiment of the present invention.

The digital audio player 22, having a display 24, may be coupled through an interface 20 to the adapter 18. In one embodiment, the adapter 18 may fit in an opening 14 which is aligned in the width dimension of conventional cassette tapes. Thus, as shown in FIG. 2, the cassette tape adapter 18 may receive a connection 20 through an interface 26.

The interface 26 is in turn coupled to sensors 32. Each sensor 32 is arranged to detect rotation of a simulated tape spool 30. Each tape spool 30 interacts with a tape drive spindle (not shown) within the cassette player 12. As with conventional cassette tapes, a spindle rotates the spool 30 to drive the tape. In this case, no tape may be included with the adapter 18. Instead, rotation of the spools 30 may be detected by the sensors 32. The sensors 32 detect spool motion and the direction of spool motion. The sensors 32 may include optical encoders or may detect an induced voltage from a rotating coil or magnet.

In addition, the position of a tape record/playback head may be sensed by a sensor 28. The sensor 28 may be a microswitch in one embodiment. The sensor 28 determines information about what state (e.g., play or record or stop) the cassette player 12 is currently in as a result of operation of a control 16.

Thus, the sensors 32 can determine whether the play button 16 has been operated based on rotation of the spools 30 and thereafter can determine if either the stop button 16b or pause button 16e has been operated based on lack of spool 30 rotation. Similarly, the sensors 32, alone or in conjunction with the sensor 28, can determine if the rewind button 16c has been operated based on the direction of spool 30 rotation. In the same fashion, operation of the fast forward button 16d can be detected based on the speed of rotation of the spools 30. Finally, operation of the record button 16f can be detected through the sensor 28.

As a result, the adapter 18 is capable of detecting the operation of the controls 16. The operation of a control 16 may be translated to correspondingly operate a digital audio player 22. Thus, a control 16 may be utilized to control a cassette player 12 when no digital audio player is present, and to control a digital audio player 22 when the adapter 18 is located in the player 12.

Figure 3:
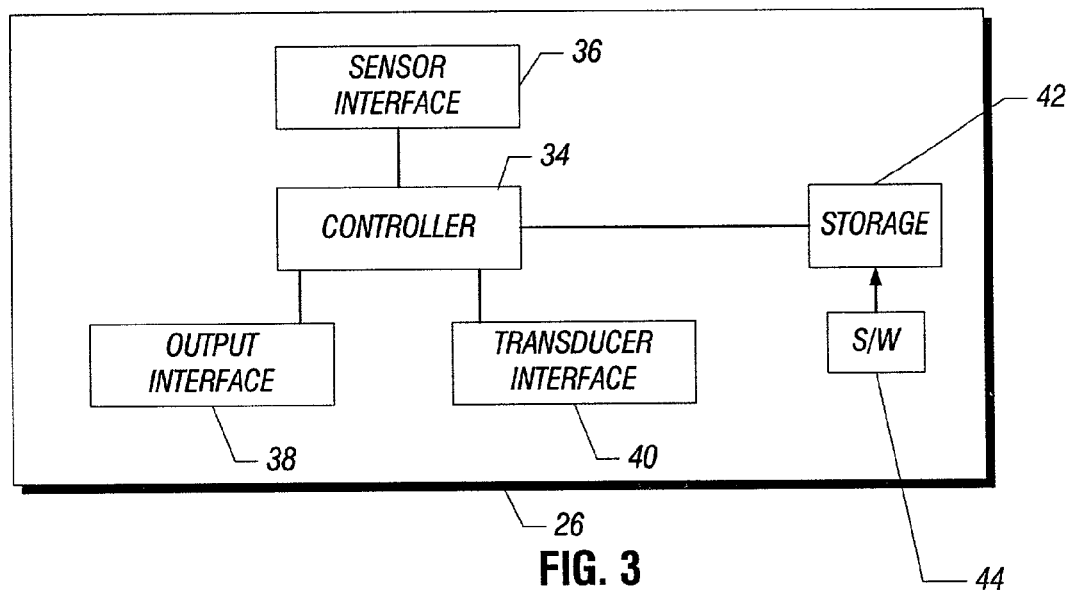
FIG. 3 is a schematic depiction of the cassette tape adapter shown in FIG. 2.

Referring to FIG. 3, the interface 26 may include a controller 34 which may be a processor in one embodiment. The controller 34 is coupled to a storage 42 that may store software 44. The controller 34 may also be coupled to a sensor interface 36 that couples to the sensors 32 and 28. In addition, the controller 34 may be coupled to a output interface 38 that is coupled through the connector 20 to the digital audio player 22.

In other embodiments, instead of using a controller 34 and software to control the operation of the adapter 18, hardwired logic may be utilized to implement the functions described below. In such case, the logic may be utilized to sense the operation of the tape player and to convert the signals to appropriate form for controlling the digital audio player 22.

Figure 4:
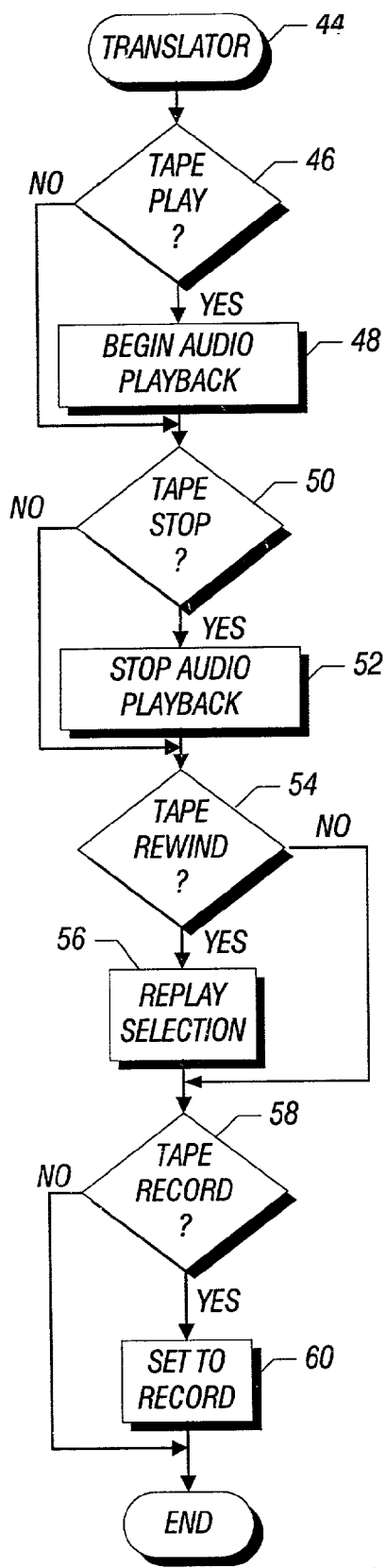
FIG. 4 is a flow chart for software in accordance with one embodiment of the present invention.

Turning finally to FIG. 4, the software 44 may translate conventional tape player 12 control operations into corresponding operations of a digital audio player 22. A check at diamond 46 determines whether the play button 16a has been operated. If so, the audio player may be turned on as indicated in block 48. Next, a check at diamond 50 determines whether the tape stop button 16b or pause button 16e has been operated. If so, the audio player 22 playback may be paused as indicated in block 52.

In some embodiments of the present invention, operation of the stop button 16b may be distinguished from operation of the pause button 16e. In some cassette tape players, operation of the record and playback head may distinguish the stop and pause operations. For example, the pause operation may be distinguished because the record and playback head may remain in contact with the tape. However, in those cases when the stop button is operated, the record and playback head may be removed from the tape. Thus, by detecting the operation of the record and playback head together with the cessation of rotation of the spools 30, it is possible to determine whether pause or stop has been selected on the tape player 12. Different operations may be implemented on the digital audio player 22 in response to stop or pause operation on the tape player 12. For example, when the pause button 16e is pressed, playback may be paused, but when the stop button 16b is pressed, playback may be resumed from the beginning of a selection.

Similarly, a check at diamond 54 determines whether the rewind button 16c has been operated. If so, as indicated in block 56, a selection may be replayed on the player 22. Similarly, if the tape record button 16f has been operated, as determined in diamond 58, the digital audio player 22 may be set to the record mode.

Information may be sent from the tape player 12 to the digital audio player 22 through a wire in one embodiment of the present invention. Alternatively, a separate wire may be utilized for each controlled function. In one embodiment, a single wire may be utilized to supply power to the adapter 18 and to send serial data back to the player 22. In one embodiment, the single wire embodiment may use a specially designed headphone plug/jack combination to make an extra connection while still being compatible with a regular headphone plug. This may eliminate the need for an extra connector.

Figure 5:
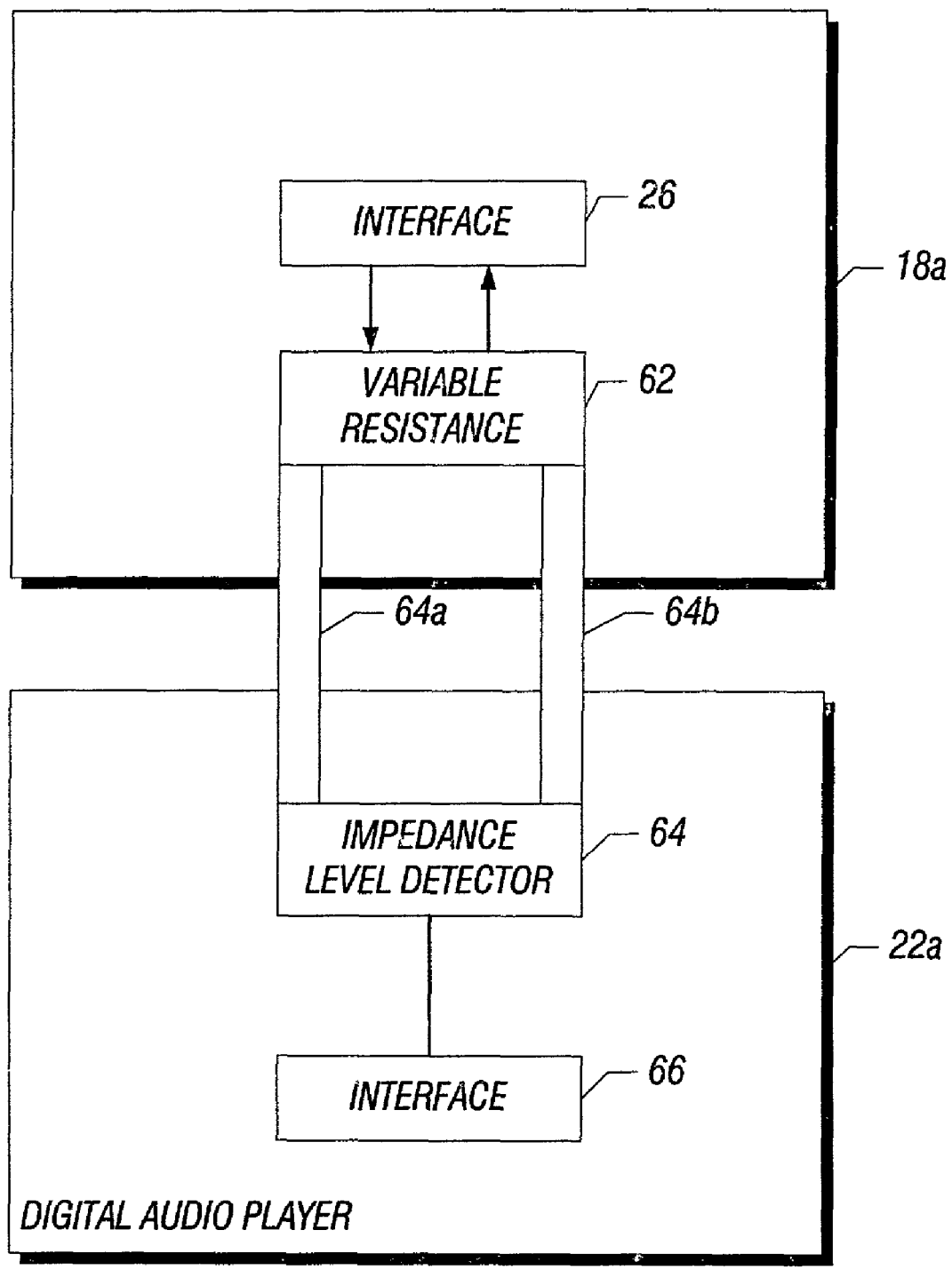
FIG. 5 is a schematic depiction of another embodiment of the present invention.

In still another embodiment, the audio player 22 may detect changes in the audio load impedance, as indicated in FIG. 5, in a remote device 18a, which in one embodiment, may be a cassette tape adapter. The remote device 18a may change a load impedance for example using a variable resistor 62. The digital audio player 22a may then detect the impedance level of the remote device using a detector 64. The connection 64 may be an audio output such as the left and right headphone or speaker outputs of the digital audio player 22a. Applying higher or lower impedances to the audio signal may indicate other operations. This information is translated by an interface 66 to control the player 22a. In this way, several states may be communicated by using various channel and impedance combinations.

For example in one embodiment, the variable resistor 62 may apply one of two different impedance levels to an audio signal. In addition, in a situation where the connection 64 is the left and right headphone speaker outputs, two channels may be provided, each of which may be provided with one of two selectively applied impedance levels. This enables the provision of four different states. Namely, one state is where a lower impedance is applied to both channels, another state is where a high impedance is applied to both channels, another state is where a low impedance is applied to the left channel and a high impedance is applied to the right channel and another state is where a high impedance is applied to the left channel and the low impedance is applied to the right channel. As a result, four different conditions such as play, stop, pause and rewind may be recognized and provided back to the digital audio player 22a. Thus, a significant amount of information may be provided with only two impedance levels. With more impedance levels, a significant amount of information may be provided back to the digital audio player using only two wires.

The remote device 18a may be a remote control for a digital audio player 22a. By detecting impedance levels, the number of wires needed to convey information to the player 22a may be reduced.

In still another embodiment, the DC level of the audio signal may be shifted. The audio signal outputs are generally AC coupled so the adapter 18 may impose a DC level on the signal that may be detected by the audio player 22.

In still another embodiment, wireless signals such as radio frequency or infrared signals may be sent from the player 12 to the audio player 22. This eliminates the need for a physical connection.

In some embodiments of the present invention, the need to separately operate the cassette player 12 and digital audio player 22 may be reduced or eliminated. Thus, the user may not have to operate both the cassette player 12 and the audio player 22. Whenever the cassette player 12 is started or stopped, the audio player 22 may respond appropriately, preventing excessive battery drain in the audio player 22.

In an embodiment in which the sensors 32 use moving coils, those coils may also generate electricity. That electricity may be used to operate the adapter 18.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A digital audio player comprising:
   an impedance level detector; and
   an interface coupled to said detector to change the operation of said digital audio player based on information provided by said impedance level detector;
   wherein said impedance level detector detects an impedance which is indicative of a condition including one of a play, a stop, a pause, or a rewind command.

* * * * *